United States Patent [19]

Ohsono et al.

[11] Patent Number: 5,176,579
[45] Date of Patent: Jan. 5, 1993

[54] BELT-TYPE CONTINUOUSLY VARIABLE TRANSMISSION

[75] Inventors: Kouhei Ohsono; Toshiyuki Yumoto; Masayuki Fuchino, all of Saitama, Japan

[73] Assignee: Honda Giken Kogyo Kabushiki Kaisha, Tokyo, Japan

[21] Appl. No.: 784,253

[22] Filed: Oct. 29, 1991

[30] Foreign Application Priority Data

Oct. 29, 1990 [JP] Japan .................. 2-291513

[51] Int. Cl.⁵ .......................................... F16H 59/00
[52] U.S. Cl. .......................................... 474/1; 474/18
[58] Field of Search .................. 474/8, 11, 12, 17, 18, 474/28, 69, 70, 1-3

[56] References Cited

U.S. PATENT DOCUMENTS

| 4,459,872 | 7/1984 | Tibbles . |
| 4,526,061 | 7/1985 | Sakakibara et al. .................. 474/8 |
| 4,904,229 | 2/1990 | Hattori ............................ 474/18 X |
| 4,955,848 | 9/1990 | Kotajima ........................ 474/18 X |

FOREIGN PATENT DOCUMENTS

| 073286 | 3/1983 | European Pat. Off. . |
| 096011 | 12/1983 | European Pat. Off. . |
| 3703759 | 9/1987 | Fed. Rep. of Germany . |
| 63-47560 | 2/1988 | Japan . |

Primary Examiner—Thuy M. Bui
Attorney, Agent, or Firm—Lyon & Lyon

[57] ABSTRACT

A belt-type continuously variable transmission in which a drive pulley mounted on an input shaft and a driven pulley mounted on an output shaft are connected by an endless belt, a forward- and backward-movement switchover mechanism for transmitting a driving force from an engine to the drive pulley is disposed adjacent the stationary pulley half of the drive pulley, and a starting clutch for transmitting the rotation of the output shaft to driving wheels is disposed adjacent stationary pulley half of the driven pulley. This ensures that dead spaces created in a section opposed to both the movable pulley halves which move axially can be utilized as spaces for disposition of the forward- and backward-movement switchover mechanism and the starting clutch, thereby enabling the forward- and backward-movement switchover mechanism and the starting clutch to be disposed in a compact layout.

5 Claims, 4 Drawing Sheets

BELT-TYPE CONTINUOUSLY VARIABLE TRANSMISSION

BACKGROUND OF THE INVENTION

1. Field of the Invention

The field of the present invention is belt-type continuously variable transmissions comprising an input shaft connected to an engine and driven by the engine, an output shaft disposed in parallel to the input shaft and connected to driving wheels, a drive pulley comprised of a stationary pulley half and a movable pulley half which are carried on the input shaft, a driven pulley comprised of a stationary pulley half and a movable pulley half which are carried on the output shaft, and an endless belt connecting the drive pulley and the driven pulley, the stationary and movable pulley halves of the pulleys being arranged in a diagonal relationship with one another.

2. Description of the Prior Art

Such a belt-type continuously variable transmission is conventionally known, for example, from Japanese Patent Application Laid-open No.47560/88.

In the above prior art belt-type continuously variable transmission, the drive pulley mounted on the input shaft and the driven pulley mounted on the output shaft are interconnected by the endless belt, and the input and output shafts are interconnected by a backward gear train. Thus, the output shaft is rotated in the same direction as the input shaft through both the pulleys by operation of the forward clutch and a hydraulic coupling serving as a starting clutch, while the output shaft is rotated in the opposite direction from the direction of rotation of the input shaft through the backward gear train by the operation of the backward clutch and the hydraulic coupling serving as the starting clutch.

However, the above prior art belt-type continuously variable transmission has a disadvantage that a space within a transmission case cannot be effectively utilized, resulting in an increased size of the continuously variable transmission, because all of the hydraulic coupling, the starting clutch, the backward clutch and the backward gear train are disposed on one side of the drive and driven pulleys, and an oil chamber for moving the movable pulley half of the driven pulley is also disposed on the same side.

SUMMARY OF THE INVENTION

Accordingly, it is an object of the present invention to reduce the size of the belt-type continuously variable transmission including a starting clutch and a forward- and backward-movement switchover mechanism by a more compact layout thereof.

To achieve the above object, according to the present invention, there is provided a belt-type continuously variable transmission comprising an input shaft connected to an engine and driven by the engine, an output shaft disposed in parallel to the input shaft and connected to driving wheels, a drive pulley comprised of a stationary pulley half and a movable pulley half which are carried on the input shaft, a driven pulley comprised of a stationary pulley half and a movable pulley half which are carried on the output shaft, and an endless belt connecting the drive pulley and the driven pulley, the stationary and movable pulley halves of the pulleys being arranged in a diagonal relationship with one another, wherein the transmission further includes a forward- and backward-movement switchover mechanism disposed adjacent the stationary pulley half of the drive pulley on the input shaft for transmitting a driving force from the engine to the drive pulley, and a starting clutch disposed adjacent the stationary pulley half of the driven pulley on the output shaft for transmitting the rotation of the output shaft to the driving wheels.

With the above construction, the movable pulley halves of the drive and driven pulleys are moved axially of the input and output shafts with a variation in reduction ratio and therefore, a mechanism and a space for such axial movement are required, resulting in a larger axial size of the movable pulley halves than the axial size of the corresponding stationary pulley halves on the mating shaft. For this reason, in a condition in which the drive pulley on the input shaft and the driven pulley on the output shaft are opposed to each other, dead spaces are created outside of the stationary pulley half of the drive pulley on the input shaft and outside of the stationary pulley half of the driven pulley on the output shaft. If the forward- and backward-movement switchover mechanism is disposed by utilizing the dead space provided adjacent the stationary pulley half of the drive pulley on the input shaft, and the starting clutch is disposed by utilizing the space provided adjacent the stationary pulley half of the driven pulley on the output shaft, the forward- and backward-movement switchover mechanism and the starting clutch can be disposed in a more compact layout.

The above and other objects, features and advantages of the invention will become apparent from a reading of the following description of the preferred embodiments, taken in conjunction with the accompanying drawings.

BRIEF DESCRIPTION OF THE DRAWINGS

Drawings illustrates a preferred embodiment of the present invention, wherein.

DESCRIPTION OF THE PREFERRED EMBODIMENTS

The present invention will now be described by way of a preferred embodiment in connection with the accompanying drawings.

Figure 1:
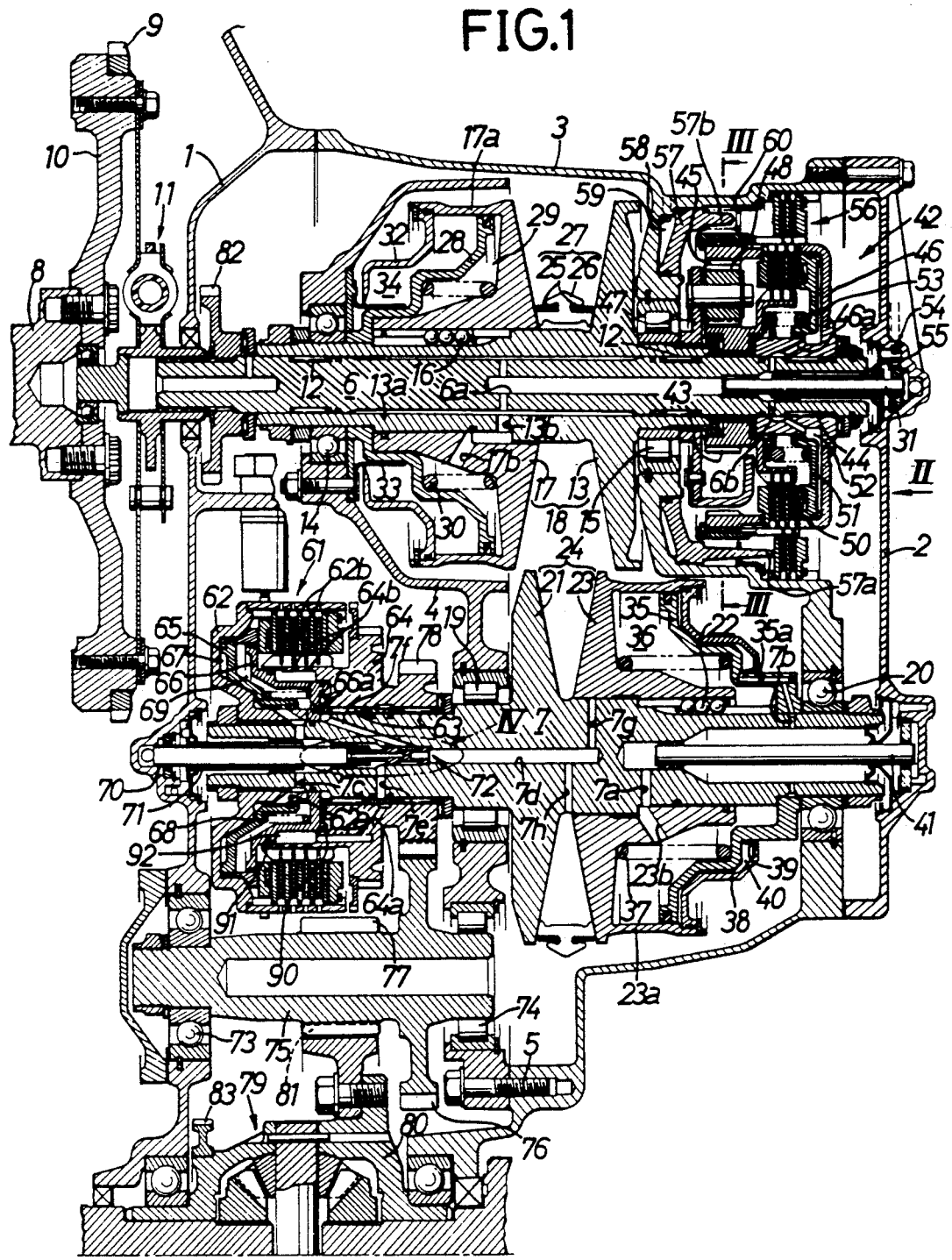
FIG. 1 is a longitudinal sectional view of a power transmitting system comprising a belt-type continuously variable transmission of the embodiment.
Figure 2:
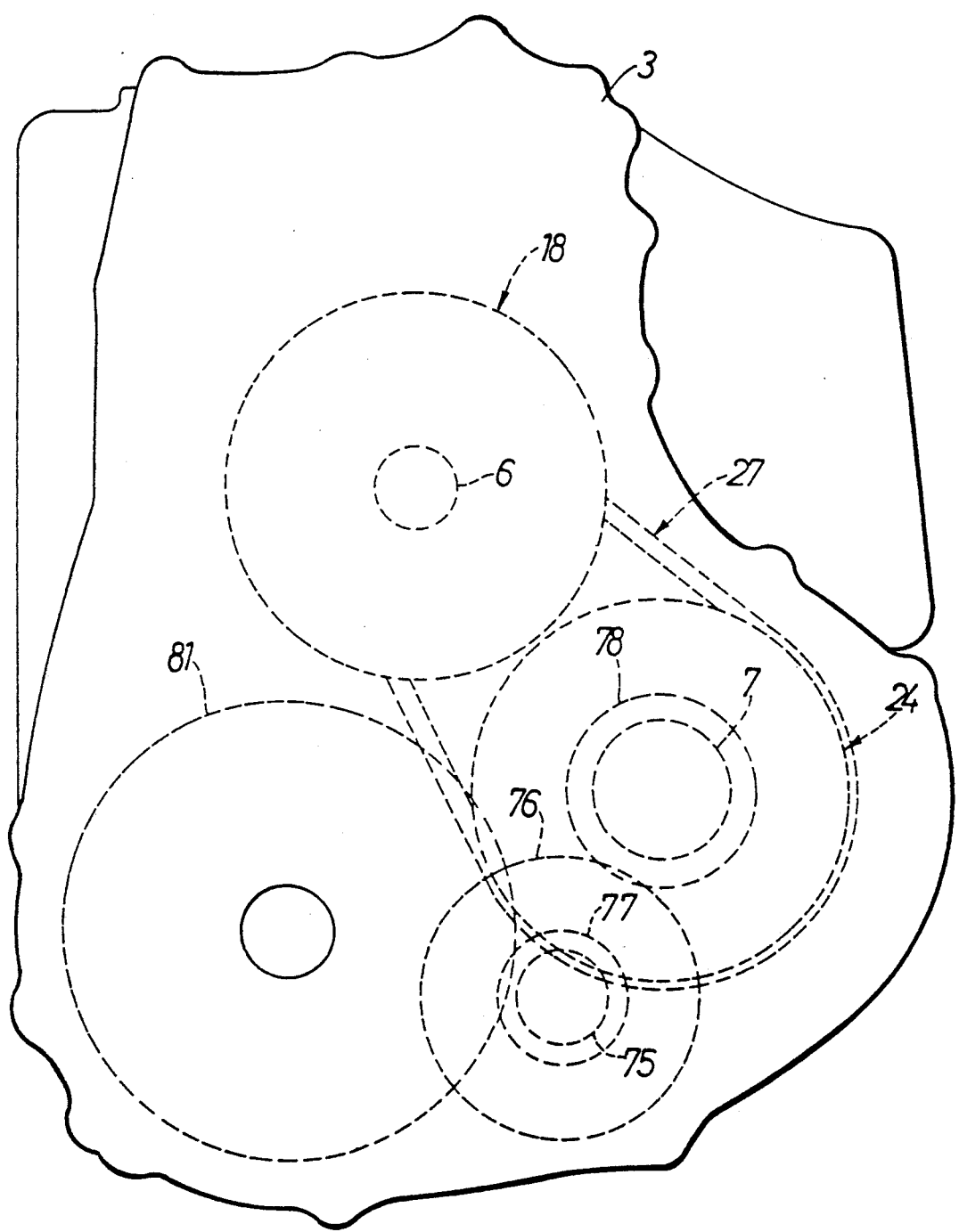
FIG. 2 is a view taken along an arrow II in FIG. 1.

A power transmitting system in this embodiment is connected to an engine horizontally disposed at a front portion of a vehicle body. As shown in FIGS. 1 and 2, an intermediate plate 4 is fixed by a bolt 5 within a transmission case 3 whose left and right surfaces are covered with a flywheel case 1 and a side cover 2, respectively. An input shaft 6 and an output shaft 7 are supported in parallel by the transmission case 3 and the intermediate plate 4. A flywheel 10 is secured to a right end of a crankshaft 8 of the engine and has, on an outer periphery thereof, a ring gear 9 which is meshed with a pinion (not shown) of a starter motor. The flywheel 10 and a left end of the input shaft 6 are interconnected through a damper 11.

A shank portion 13a of a stationary pulley half of a drive pulley 18 is carried on an outer periphery of the input shaft 6 with two needle bearings 12 interposed therebetween and is supported at its left and right ends by a ball bearing 14 mounted on the intermediate plate 4 and by a roller bearing 15 mounted on the transmission case 3. A movable pulley half 17 is carried on an outer periphery of the shank portion 13a of the stationary pulley half 13 for axial movement and non-rotation relative to each other. The drive pulley 18 is constituted by the right-hand stationary pulley half 13 and the left-hand movable pulley half 17. On the other hand, the output shaft 7 is supported by a roller bearing 19 mounted on the intermediate plate 4 and by a ball bearing 20 mounted on the transmission case 3 and is integrally provided at its central portion with a stationary pulley half 21 of a driven pulley 24. A movable pulley half 23 is carried on the output shaft 7 for axial movement and non-rotation relative to each other with a ball bearing 22 interposed therebetween. The driven pulley 24 is constituted by the left-hand stationary pulley half 21 and the right-hand movable pulley half 24. The stationary pulley half 13 of the drive pulley 18 is opposed to the movable pulley half 23 of the driven pulley 24, while the movable pulley half 17 of the drive pulley 18 is opposed to the stationary pulley half 21 of the driven pulley 24, with the result that the stationary pulley halves 13 and 21 and the movable pulley halves 17 and 23 are arranged in a diagonal relationship with one another. An endless belt 27 comprised of a large number of push blocks 26 mounted on two straps 25 is wound around the pulleys 18 and 24.

An oil chamber 29 for moving the movable pulley half 17 toward the stationary pulley half 13 is defined by a partition member 28 by which the shank portion 13 a of the stationary pulley half 13a of the drive pulley 18 is supported and by a flange 17a formed around an outer periphery of the movable pulley half 17. A spring 30 is mounted in a compressed manner in the oil chamber 29 for providing an initial load between the drive pulley 18 and the endless belt 27. An oil is supplied into the oil chamber 29 through an inner feed pipe 31 inserted into the input shaft 6 from its right end, an oil passage 6a defined in the input shaft 6, an oil passage 13b defined in the shank portion 13a of the stationary pulley half 13, and an oil passage 17b defined through the movable pulley half 17. An inner periphery of a canceller piston 32 having an outer periphery carried on a tip or leading end of the flange 17a slidable abuts against a sealing member 33 supported on the intermediate plate 4, thereby defining a canceller 34 between the canceller piston 32 itself and the partition member 28. The canceller 34 and the oil chamber 29 communicate with each other through an oil passage (not shown) provided in the partition member 28.

An oil chamber 36 for moving the movable pulley half 23 toward the stationary pulley half 21 is defined by a partition member 35 supported at the right end of the output shaft 7 and by a flange 23a formed around an outer periphery of the movable pulley half 23. A spring 37 is mounted in a compressed manner within the oil chamber 36. Oil is supplied into the oil chamber 36 through a feed pipe 41 inserted into the output shaft 7 from its right end, an oil passage 7a defined in the output shaft 7, and an oil passage 23b defined through the movable pulley half 23. A canceller piston 38 having an outer periphery carried on a tip or leading end of the flange 23a includes a sealing member 39 which comes into sliding contact with an inner periphery of the canceller piston 38. The oil is supplied into a canceller 40 defined between the canceller piston 38 and the partition member 35 through an oil passage 7b defined in the output shaft 7 and an oil passage 35a provided in the partition member 35.

Figure 3:
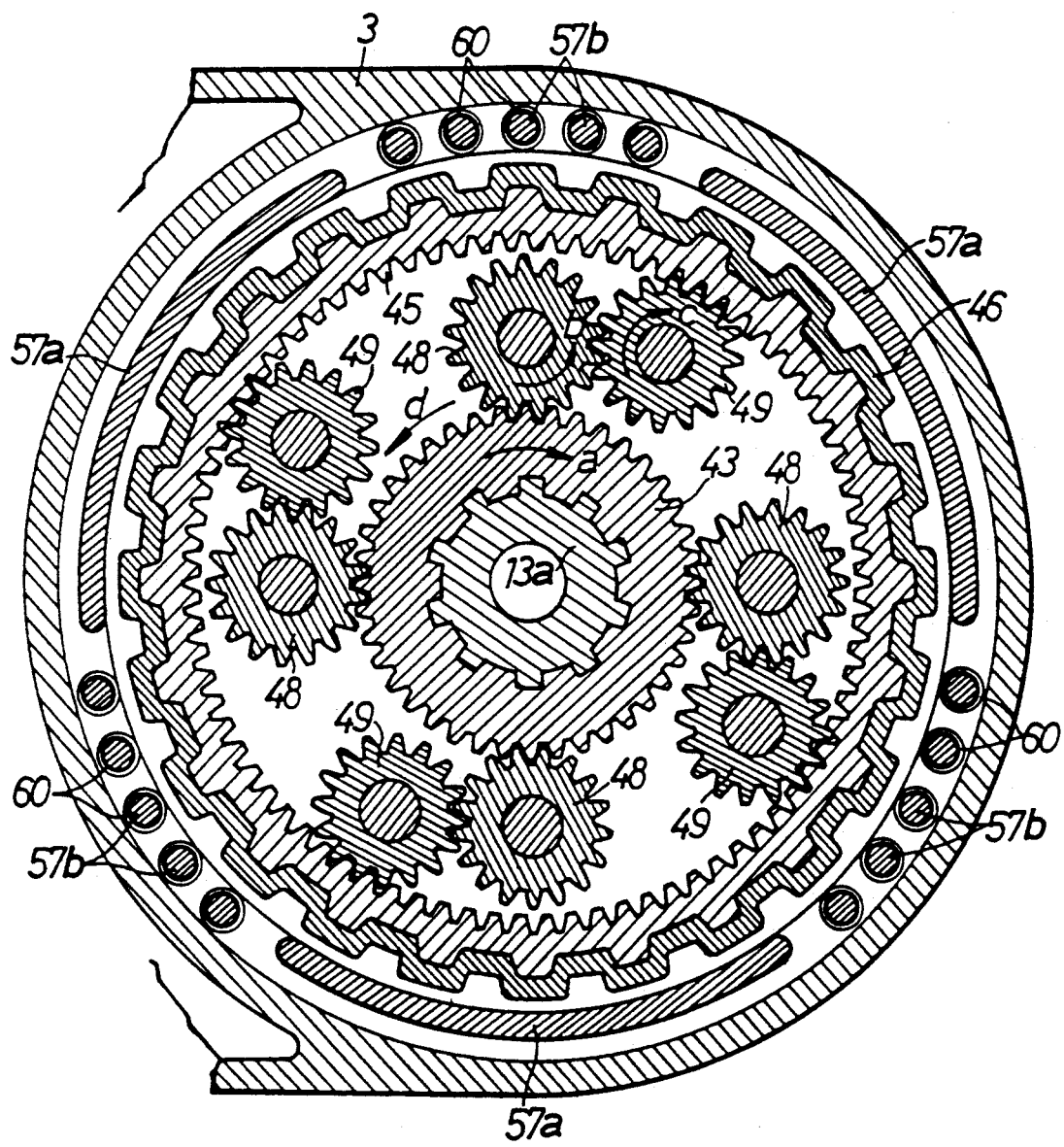
FIG. 3 is a sectional view illustrating a forward- and backward-movement switchover mechanism and taken along a line III—III in FIG. 1.

At the right end of the input shaft 6, i.e., at the right side of and adjacent to the stationary pulley half 13 of the drive pulley 18, there is a forward- and backward-movement switchover mechanism 42 for transmitting the rotation of the input shaft 6 in the same direction or opposite direction. As can be seen from FIGS. 1 and 2 along with FIG. 3, the forward- and backward-movement switchover mechanism 42 comprises a sun gear 43 having 40 teeth and spline-connected to the input shaft 6, a clutch outer 46 which is carried on the right end of the input shaft 6 with a needle bearing 44 interposed therebetween and on an inner periphery of which a ring gear 45 having 80 teeth is formed, and four pairs of planetary gears 48 and 49 which are carried on a disk carrier 47 spline-connected to the right end of the shank portion 13a of the stationary pulley half 13, and the planetary gears 48 and 49 of each pair are meshed with each other. One of planetary gears 48 is meshed with the sun gear 43, while the other gear 49 is meshed with the ring gear 45.

A multi-plate clutch 50 is disposed within the clutch outer 46 for bringing the sun gear 43 and the clutch outer 46 into engagement with "each other when a vehicle is to be moved forward. An oil chamber 52 is defined on the right side of a clutch piston 51 axially slidable carried within the clutch outer 46, while a return spring 53 is mounted in a compressed manner on the left side of the clutch piston 51. Thus, pressurized oil is supplied into the oil chamber 52 through an oil passage 54, an outer feed pipe 55 disposed within the input shaft 6, an oil passage 6b defined in the input shaft 6, and an oil passage 46a defined in the clutch outer 46. On the other hand, a multi-plate brake 56 is disposed between an outer periphery of the clutch outer 46 and the transmission case 3 for coupling the clutch outer 46 and the transmission case 3 to each other when the vehicle is to be moved backward. A brake piston 57 is axially slidable carried in the transmission case 3 to surround the clutch outer 46 and has an oil chamber 59 provided there behind and supplied with the pressure oil through an oil passage 58. The brake piston 57 includes arcuate urging portions 57a at three circumferential points thereof, respectively, and a return spring 60 supported on a plurality of guide projections 57b provided between the urging portions 57a.

A multi-plate type starting clutch 61 mounted at the left end of the output shaft 7 comprises a clutch center 64 carried on the output shaft and a clutch outer 62 spline-connected to the output shaft 7 with a pair of needle bearings 63 interposed therebetween. A large number of friction plates are interposed between the clutch outer 62 and the clutch center 64. A clutch piston 65 and a canceller piston 66 are disposed within the clutch outer 62. An oil chamber 67 is defined "between the clutch outer 62 and the clutch piston 65 for bringing the starting clutch into an engaged state, and a canceller 69 is defined between the clutch piston 65 and the canceller piston 66. A return spring 68 for the clutch piston 65 is mounted in a compressed manner within the canceller 69.

An inner feed pipe 70 and an outer feed pipe 71 are coaxially inserted into the left end of the output shaft 7, so that the pressure oil supplied from between the inner and outer feed pipes 70 and 71 is supplied into the oil chamber 67 through an oil passage 7c defined in the output shaft 7 and an oil passage 62a defined in the clutch outer 62.

Figure 4:
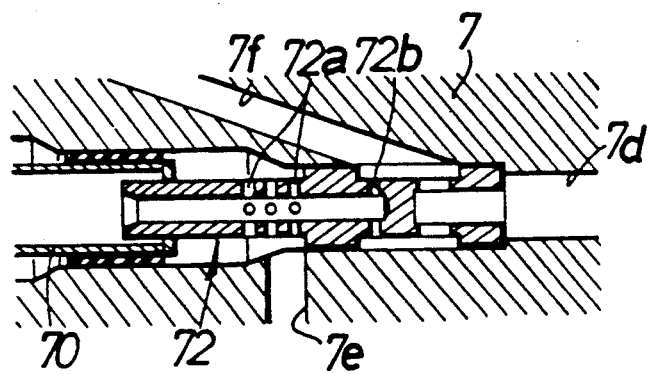
FIG. 4 is an enlarged view of a portion indicated by IV and illustrating oil passages provided in an output shaft.

On the other hand, an orifice defining member 72 is disposed in an oil passage 7d centrally defined in the output shaft 7, so that the pressure oil supplied from the inner feed pipe 70 is passed through the orifice defining member 72. As can be seen from FIGS. 1 to 3 along with FIG. 4, the pressure oil passed through an orifice 72a in the orifice defining member 72 is supplied through an oil passage 7e defined in the output shaft 7 and an oil passage 64a defined in the clutch center 64 into an annular oil supply chamber 92 which is defined between the clutch center 64 and the canceller piston 66 by a pair of sealing rings 90 and 91. The oil supply chamber 92 communicates with the inside of the clutch outer 62 through a large number of oil supply ports 64b provided along an outer periphery of the clutch center 64, while the inside of the clutch outer 62 communicates with the outside of the starting clutch 61 through a large number of oil discharge ports 62b provided along the clutch outer 62. This ensures that the oil in the oil supply chamber 92 is introduced through the oil supply ports 64b into the clutch outer 62, where it equally cools the friction plates increased in temperature by friction heat and is then discharged through the oil discharge ports 62b to the outside of the starting clutch 61. In this case, the oil for cooling the clutch outer 62 is discharged promptly through the oil discharge ports 62b to the outside by centrifugal force, thereby promoting the new supply of oil into the clutch outer 62 and providing a further improved effect for cooling the friction plates.

The pressurized oil passed through the orifice 72b is also supplied to the canceller 69 through an oil passage 7f defined in the output shaft 7 and an oil passage 66a defined in the canceller piston 66 and is further passed through oil passages 7d and 7g to lubricate a sliding portion of the movable pulley half 23 and passed through an oil passage 7h to lubricate the endless belt 27.

A reduction shaft 75 is carried on the flywheel case 1 and the intermediate plate 4 with a ball bearing 73 and a roller bearing 74 interposed therebetween, respectively and comprises a first intermediate gear 76 and a second intermediate gear 77. An output gear 78 integrally formed on the right end of the clutch center 64 is meshed with the first intermediate gear 76, and the second intermediate gear 77 is meshed with a final gear 81 mounted on a gear box 80 of a differential 79.

Reference numeral 82 in FIG. 1 indicates an oil pump drive gear mounted at the left end of the input shaft 6. Driving of an oil pump (not shown) by the oil pump drive gear 82 ensures not only that an oil pump having a diameter different than that of an oil pump mounted on the input shaft 6 can be used but also that the freeness of layout of the oil pump can be increased. In addition, reference numeral 83 indicates a speedometer gear mounted around an outer periphery of the gear box 80 of the differential 79.

The operation of the embodiment of the present invention having the above-described construction will be described below.

A driving force of the engine is transmitted from the crankshaft 8 through the damper 11 to the input shaft 6, but when both of the multiplate clutch 50 and the multiplate brake 56 of the forward- and backward-movement switchover mechanism 42 are in their disengaged states, the rotation of the input shaft 6 is not transmitted to the drive pulley 18. If the pressurized oil is supplied to the oil chamber 52 in the multiplate clutch 50 through the oil passage 54, the feed pipe 55, the oil passage 6b and the oil passage 46a in this condition, the clutch piston 51 is moved leftward to cause the engagement of the multiplate clutch, so that the clutch outer 46 having the ring gear 45 is integrally coupled with the sun gear 43 splineconnected to the input shaft 6. This restrains the rotation of the planetary gears 48 and 49 and hence, the rotation of the input shaft 6 is transmitted directly to the carrier 47 through the sun gear 43 and the planetary gears 48 and 49 to rotate the drive pulley 18 at the same speed and in the same direction as does the input shaft 6.

If the drive pulley 18 is rotated in the above manner, the driven pulley 24 is driven through the endless belt 27 to rotate the output shaft 7 carrying the driven pulley 24. If the pressurized oil is supplied into the oil chamber 67 through the feed pipe 71, the oil passage 7c and the oil passage 62a to permit the engagement of the starting clutch 61 from this condition, the clutch outer 62 and the clutch center 64 are integrally coupled with each other. This permits the rotation of the output shaft 7 to be transmitted through the output gear 78 integrally formed on the clutch center 64 and the first and second intermediate gears 76 and 77 integrally formed on the reduction shaft 75 to the final gear 81 of the differential 79 to drive left and right front wheels to move the vehicle forward.

On the other hand, if the pressure oil is supplied through the oil passage 58 into the oil chamber 59 in the multi-plate brake 56, the brake piston 57 is moved rightward to permit the engagement of the multi-plate brake 56, thereby integrally coupling the clutch outer 46 to the transmission case 3. At this time, if the sun gear 43 is rotated in a direction indicated by an arrow a in FIG. 3, the planetary gears 48 and 49 are rotated in a direction of an arrow b and in a direction of an arrow c, respectively. Because the clutch outer 46 provided with the ring gear 45 with which the planetary gears 49 are meshed is fixed by the multi-plate brake 56 however, the carrier 47 is rotated in a direction of an arrow d, i.e., the sun gear 43 is rotated in an opposite direction, by a reaction force received by the planetary gears 49 from the ring gear 45. The rotational speeds of the sun gear 43 and the carrier 47 are the same as each other, because the numbers of teeth of the sun gear 43 and the ring gear 45 are of 40 and 80, respectively. The engagement of the multi-plate brake 56 causes the input shaft 6 and the drive pulley 18 to be rotated in the opposite direction, and the output shaft 7 to which the rotation thereof is transmitted through the endless belt 27 is also rotated in the opposite direction from that described above. Therefore, if the starting clutch 61 is brought into its engaged state, the vehicle is moved backward.

The starting clutch 61 is mounted independently from the multi- plate clutch 50 and the multi-plate brake 56 of the forward- and backward-movement switchover mechanism 42 as described above and therefore, it is possible to provide a smooth starting performance and a smooth forward- and backward-movement switchover performance. In other words, if the multi-plate clutch 50 of the forward- and backward-movement switchover mechanism 42 is used as a starting clutch, it is required to supply a large amount of lubricating oil in order to insure a smooth starting performance. If doing so, however, there is a disadvantage that the multi-plate clutch 50 has a reduced disengaging performance. In addition, even if it is required to disengage the multi- plate clutch during travelling of the vehicle, a valve for cancelling a centrifugal hydraulic pressure makes it difficult to provide a smooth control of the hydraulic pressure at the start of the vehicle. For this reason, a structure in which the multi-plate clutch 59 cannot be disengaged during travelling is generally used. However, by provision of the forward- and backward-movement switchover mechanism 42 and the starting clutch 61 separately from each other, it is possible to establish the respective characteristics thereof independently, ensuring that the starting performance and the forward- and backward-movement switchover performance can be reconciled. Further, both the supply of the oil to the multi-plate clutch 50 of the forward- and backward-movement switchover mechanism 42 and the supply of the oil to the starting clutch 61 are conducted through the feed pipes 55 and 71 and hence, the need for the sealing ring is eliminated, ensuring that the friction of an oil sealing portion can be minimized during a usual travelling in which the forward- and backward-movement switchover mechanism 42 is integrally connected with the input shaft 6 and the starting clutch 61 is integrally connected with the output shaft 7.

When the throttle opening degree of the engine is small, the pressurized oil is supplied through the feed pipe 41 and the oil passages 7a and 23b to the oil chamber 36 defined behind the movable pulley half 23 of the driven pulley 24, so that the movable pulley half 23 is moved to a position closest to the stationary pulley half 21. This causes the effective radius of the driven pulley 24 to be increased, allowing the endless belt portion 27 wound around the driven pulley 24 to be moved radially outwardly, so that the endless belt portion 27 wound around the drive pulley 18 is moved radially inwardly while moving the movable pulley half 17 away from the stationary pulley half 13, thereby decreasing the effective radius of the drive pulley 18 to provide a maximum reduction ratio of the belt type continuously variable transmission (see FIG. 1). With an increase in throttle opening degree, the pressure oil is supplied through the feed pipe 31 and the oil passages 6a, 13b and 17b into the oil chamber 29 defined behind the movable pulley half 17 of the drive pulley 18, while at the same time, the pressure applied to the oil chamber 36 in the driven pulley 24 is reduced. As a result, the effective radius of the drive pulley 18 is gradually increased, while the effective radius of the driven pulley 24 is gradually decreased, thereby decreasing the reduction ratio of the belt type continuously variable transmission.

During operation of the belt type continuously variable transmission, the centrifugal hydraulic pressure applied to the oil chamber 29 in the drive pulley 18 is compensated by the centrifugal hydraulic pressure applied to the canceller 34 communicating with the oil chamber 29, and the centrifugal hydraulic pressure applied to the oil chamber 36 in the driven pulley 24 is compensated by the centrifugal hydraulic pressure of the oil supplied through the oil passages 7 D and 35a to the canceller 40. The canceller piston 32 of the drive pulley 18 and the canceller piston 38 of the driven pulley 24 are designed to move leftward and rightward within widths of the corresponding partition members, so that a decrease in lateral sizes of the movable pulley halves 17 and 23 and a sufficient cancel led hydraulic pressure can be insured.

The pressurized oil supplied from the feed pipe 70 inserted into the left end of the output shaft 7 is reduced through the orifice 72a in the orifice defining member 72 and then supplied through the oil passages 7e and 64a into the starting clutch 61 to lubricate and cool the friction plates. On the other hand, a portion of the pressurized oil reduced through the orifice 72a in the orifice defining member 72 is supplied through the oil passages 7f and 65a into the canceller 69 in the starting clutch 61 to compensate for the centrifugal hydraulic pressure applied to the oil chamber 67. A portion of the pressurized oil reduced through the orifice 72a is passed from the oil passage 7d through the oil passage and 7g to lubricate the sliding surfaces of the movable pulley half 23 and the output shaft 7 and also passed from the oil passage 7d through the oil passage 7h to lubricate the endless belt 27. In this way, all of the supply of oil to the oil chamber 67 in the starting clutch 61, the canceller 69 and the friction plates, the supply of oil to the sliding portion of the driven pulley 24 and the supply of oil to the endless belt 27 are conducted through the inside of the output shaft 7 and hence, an oil supply system therefor can be extremely simplified.

It should be noted that the stationary pulley half 13 of the drive pulley 18 is smaller in axial size than the movable pulley half 23 of the driven pulley 24 and therefore, a space is provided outside (rightward) of the stationary pulley half 13. In addition, the stationary pulley half 21 of the driven pulley 24 is smaller in axial size than the opposed movable pulley half 17 of the drive pulley 18 and therefore, a space is provided outside (leftward) of the stationary pulley half 21. According to the present invention, the forward- and backward-movement switchover mechanism 42 is disposed by utilizing the space outside of the stationary pulley half 13 of the drive pulley 18, "and the starting clutch 61 is disposed by utilizing the space outside of the stationary pulley half 21 of the driven pulley 24. Therefore, a reduction in size of the transmission case 3 is achieved by effectively utilizing the internal space in the transmission case 3.

In addition, since both ends of the input shaft 6 and the output shaft 7 are supported by the intermediate plate 4, the drive pulley 18 and the driven pulley 24 can be previously assembled by mounting the intermediate plate 4 to the transmission case 3, leading to an enhanced assembleability. The use of the intermediate plate 4 also ensures that matching of the case is only at the opposite right and left ends of the transmission case 3, not only leading to a reduced chance of leakage of the oil, but also leading to an increased thickness of the transmission case 3 to provide an enhanced rigidity thereof.

Further, since the shank portion 13a of the stationary pulley half 13 of the drive pulley is supported on the intermediate plate 4 and the transmission case 3 with the ball bearing 14 and the roller bearing IS interposed therebetween, and the input shaft 6 is carried on the inner periphery of the shank portion 13a, while the movable pulley half 17 is carried on the outer periphery of the shank portion 13a, and since the forward- and backward-movement switchover mechanism 42 is disposed on the input shaft 6, it is possible to support the input shaft 6, the drive pulley 18 and the forward- and backward-movement switchover mechanism 42 by merely two bearings 14 and 15 leading to a simplified structure. Similarly, the disposition of the starting clutch 61 on the output shaft 7 ensures that the support bearing for the starting clutch 61 can be omitted, leading to a reduced number of parts.

We claim:

1. A belt-type continuously variable transmission for a vehicle with an engine and driving wheels comprising
an input shaft connected to the engine and driven by the engine;
an output shaft disposed in parallel to said input shaft and connected to the driving wheels;
a drive pulley comprised of a stationary pulley half and a movable pulley half which are carried on said input shaft;
a driven pulley comprised of a stationary pulley half and a movable pulley half which are carried on said output shaft; and
an endless belt connecting said drive pulley and said driven pulley to each other, said stationary and movable pulley halves of said pulleys being arranged in a diagonal relationship with one another, wherein
said transmission further includes a forward- and backward-movement switchover mechanism disposed adjacent the stationary pulley half of the drive pulley on said input shaft for transmitting a driving force from the engine to the drive pulley, and a starting clutch disposed adjacent the stationary pulley half of the driven pulley on said output shaft for transmitting the rotation of the output shaft to the driving wheels.

2. A belt-type continuously variable transmission of the type having an input shaft;
an output shaft disposed in parallel to the input shaft;
a drive pulley on the input shaft having a stationary pulley half and a movable pulley half;
a driven pulley on the output shaft having a stationary pulley half and a movable pulley half;
and an endless belt connecting said drive pulley and said driven pulley to each other;
an improvement comprising a forward- and backward-movement switchover mechanism disposed adjacent the stationary pulley half of the drive pulley on said input shaft for transmitting a driving force from the input shaft to the drive pulley, and a starting clutch disposed adjacent the stationary pulley half of the driven pulley on said output shaft for transmitting rotation from the driven pulley.

3. The transmission of claim 1 or 2, wherein the forward- and backward-movement switchover mechanism includes a clutch for selectively connecting the input shaft to the drive pulley.

4. The transmission of claim 1 or 2, wherein the forward- and backward-movement switchover mechanism is positioned in a space radically opposite the movable pulley half of the driven pulley.

5. The transmission of claim 1 or 2, wherein the staring clutch is positioned on a space radially opposite the movable pulley half of the drive pulley.

* * * * *